US012737874B2

(12) United States Patent
Onozuka et al.

(10) Patent No.: US 12,737,874 B2
(45) Date of Patent: Sep. 15, 2026

(54) VISUAL INSPECTION APPARATUS, VISUAL INSPECTION METHOD, IMAGE GENERATION APPARATUS, AND IMAGE GENERATION METHOD

(71) Applicant: Hitachi Astemo, Ltd., Hitachinaka (JP)

(72) Inventors: Hideaki Onozuka, Hitachinaka (JP); Takateru Seki, Hitachinaka (JP); Takamasa Imaizumi, Hitachinaka (JP); Hiroyuki Hayashi, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 293 days.

(21) Appl. No.: 18/280,079

(22) PCT Filed: Feb. 9, 2022

(86) PCT No.: PCT/JP2022/005038
§ 371 (c)(1),
(2) Date: Sep. 1, 2023

(87) PCT Pub. No.: WO2022/185864
PCT Pub. Date: Sep. 9, 2022

(65) Prior Publication Data

US 2024/0153066 A1 May 9, 2024

(30) Foreign Application Priority Data

Mar. 5, 2021 (JP) ................................ 2021-034932

(51) Int. Cl.
*G06T 7/00* (2017.01)
*G06T 5/50* (2006.01)
(Continued)

(52) U.S. Cl.
CPC ............. *G06T 7/0008* (2013.01); *G06T 5/50* (2013.01); *G06T 7/50* (2017.01); *G06T 7/62* (2017.01);
(Continued)

(58) Field of Classification Search
CPC ........... G06T 7/0008; G06T 5/50; G06T 7/50; G06T 7/62; G06T 11/00;
(Continued)

(56) References Cited

U.S. PATENT DOCUMENTS

2024/0202946 A1* 6/2024 Deng .................. G06V 40/107

FOREIGN PATENT DOCUMENTS

JP 2011-214903 10/2011
JP 2011214903 A * 10/2011
JP 2018-205123 12/2018

OTHER PUBLICATIONS

Siu, ChunFai, Mingzhu Wang, and Jack CP Cheng. "A framework for synthetic image generation and augmentation for improving automatic sewer pipe defect detection." Automation in Construction 137 (2022): 104213. (Year: 2022).*

(Continued)

*Primary Examiner* — Amandeep Saini
(74) *Attorney, Agent, or Firm* — Wenderoth, Lind & Ponack, L.L.P.

(57) ABSTRACT

A visual inspection apparatus is configured to inspect a surface of a piston based on a captured image acquired by a camera and a learning result acquired by conducting machine learning using a plurality of defective product sample images, each of the defective product sample images being generated by combining a two-dimensional image of a defect image that is generated based on a three-dimensionally pre-generated defect model with an image of the surface of the piston.

7 Claims, 5 Drawing Sheets

(51) Int. Cl.
*G06T 7/50* (2017.01)
*G06T 7/62* (2017.01)
*G06T 11/00* (2026.01)
*G06V 10/60* (2022.01)

(52) U.S. Cl.
CPC .............. *G06T 11/00* (2013.01); *G06V 10/60* (2022.01); *G06T 2207/20084* (2013.01); *G06T 2207/20221* (2013.01)

(58) Field of Classification Search
CPC . G06T 2207/20084; G06T 2207/20221; G06T 1/00; G06T 7/00; G06T 7/0004; G06V 10/60; G06V 10/82; G01N 21/88; G06N 20/00
USPC .......................................................... 382/141
See application file for complete search history.

(56) References Cited

OTHER PUBLICATIONS

International Search Report issued Apr. 19, 2022 in International Application No. PCT/JP2022/005038, with English translation.
Written Opinion of the International Searching Authority issued Apr. 19, 2022 in International Application No. PCT/JP2022/005038, with English translation.

* cited by examiner (a) CAVITY (b) SCRATCH (c) CIRCULAR BLISTER (d) FOREIGN SUBSTANCE BLISTER (e) BAND-LIKE BLISTER

(a) CAVITY
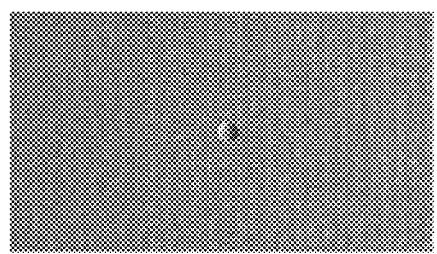
(b) SCRATCH
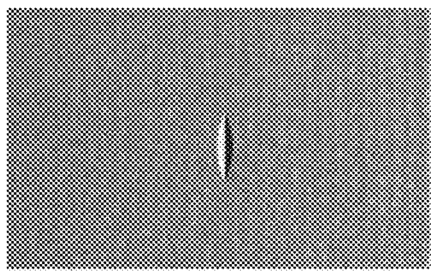
(c) CIRCULAR BLISTER
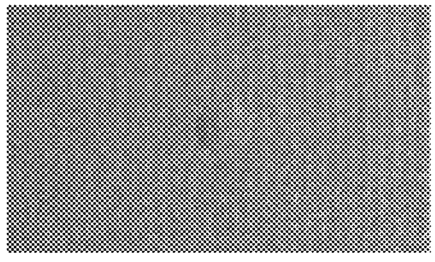
(d) FOREIGN SUBSTANCE BLISTER
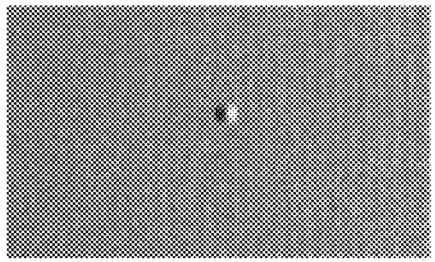
(e) BAND-LIKE BLISTER
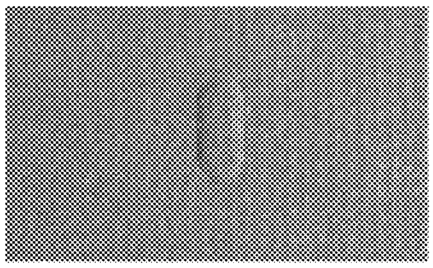

VISUAL INSPECTION APPARATUS, VISUAL INSPECTION METHOD, IMAGE GENERATION APPARATUS, AND IMAGE GENERATION METHOD

CROSS-REFERENCE TO RELATED APPLICATION

The present application claims priority under the Paris Convention to Japanese Patent Application No. 2021-034932 filed on Mar. 5, 2021. The entire disclosure of Japanese Patent Application No. 2021-034932 including the specification, the claims, the drawings, and the abstract is incorporated herein by reference in its entirety.

TECHNICAL FIELD

The present invention relates to a visual inspection apparatus, a visual inspection method, an image generation apparatus, and an image generation method.

BACKGROUND ART

Japanese Patent Application Publication No. 2018-205123 discloses an image generation apparatus including a storage portion that stores an original image acquired by imaging a surface of an inspection target and a defect image, which is an image indicating a shape of a scratch or a defect, and an image generation portion that generates a simulated inspection image. The image generation portion generates the simulated inspection image by generating a texture image having a texture feature similar to the original image from the original image acquired by imaging the surface of the inspection target and combining the defect image with the texture image.

SUMMARY OF INVENTION

Technical Problem

However, the above-described conventional technique generates the defect image to be combined with the texture image based on an image indicating a representative silhouette shape (a two-dimensional shape) of a scratch or a defect, thereby raising the necessity of preparing a large number of pieces of data indicating the silhouette shape in advance if attempting to generate the image of a scratch or a defect while reflecting unevenness of the surface of the inspection target and an illumination direction.

Solution to Problem

One of objects of the present invention is to provide a visual inspection apparatus, a visual inspection method, an image generation apparatus, and an image generation method capable of improving accuracy of inspecting a surface of an inspection target.

According to one aspect of the present invention, a visual inspection apparatus inspects a surface of an inspection target based on a captured image and a learning result acquired by conducting machine learning using a plurality of defective product sample images, which is each generated by combining a two-dimensional image of a defect image that is generated based on a three-dimensionally pre-generated defect model with an image of the surface of the inspection target.

According to the one aspect of the present invention, accuracy of inspecting a surface of an inspection target can be improved.

BRIEF DESCRIPTION OF DRAWINGS

FIG. 7 illustrates a list of defective product sample images.

DESCRIPTION OF EMBODIMENTS

First Embodiment

Figure 1:
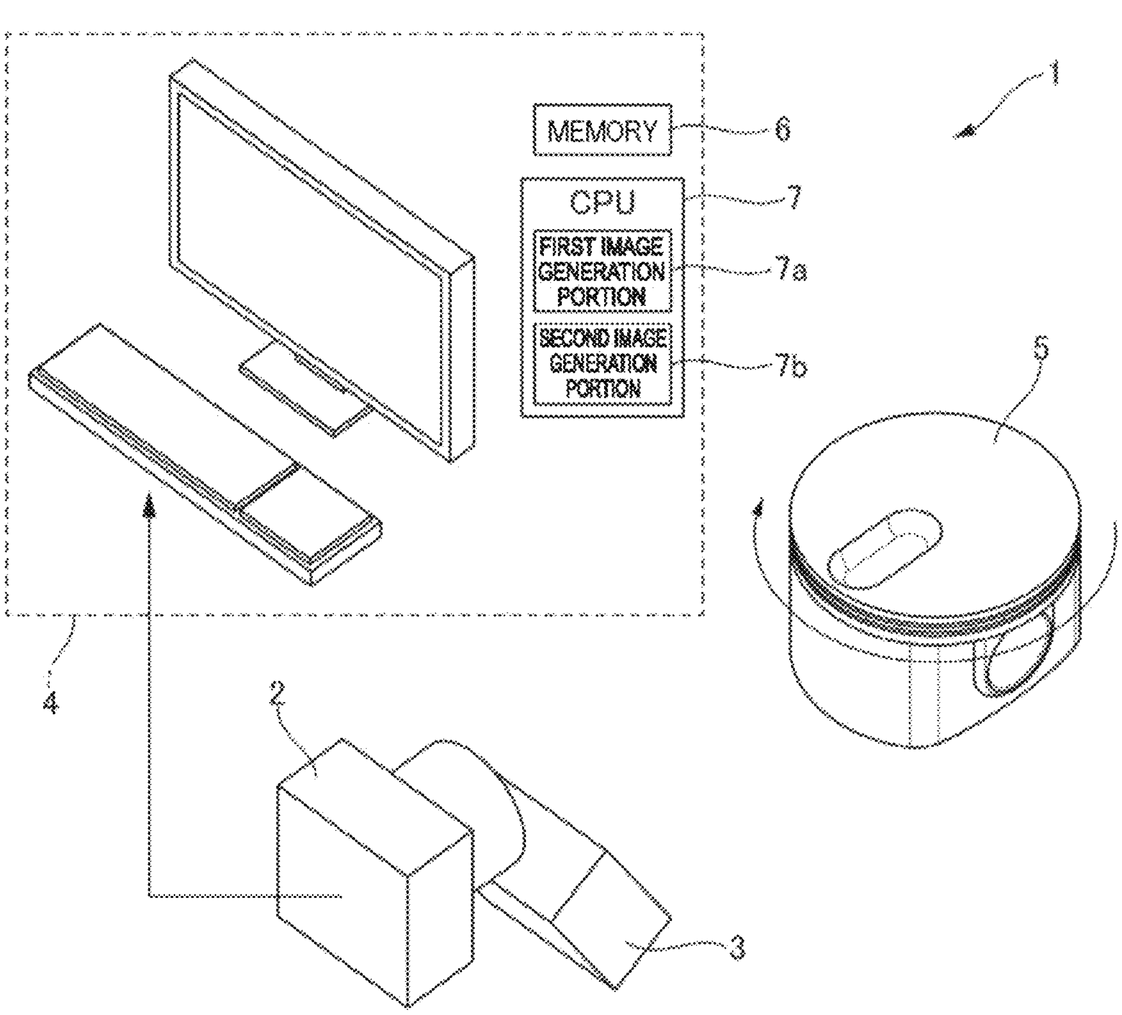
FIG. 1 schematically illustrates a visual inspection apparatus 1 according to a first embodiment.

FIG. 1 schematically illustrates a visual inspection apparatus 1 according to a first embodiment.

The visual inspection apparatus 1 according to the first embodiment includes a camera (an imaging portion) 2, an illumination device 3, and a computer 4. The camera 2 images the surface of a piston 5, which is an inspection target (an imaging step). The illumination device 3 illuminates the surface of the piston 5 with light. The computer 4 is, for example, a personal computer, and includes a memory (a storage portion) 6 and a CPU (an inspection portion) 7. The memory 6 stores a learning result acquired by conducting machine learning using a plurality of defective product sample images. The machine learning is learning using a neural network, and learning based on deep learning is employed in the first embodiment. The plurality of defective product sample images is each generated by combining a two-dimensional image of a defect shape that is generated by converting a three-dimensionally, i.e., stereoscopically pre-generated defect model into a point cloud with an image of the surface of the piston 5.

A defect is generated as a geometric envelope, and the two-dimensional image of the defect shape is generated by adding a luminance with respect to the defect model. At this time, the luminance with respect to the defect model is a luminance distribution in a predetermined range containing the defect and a predetermined portion around the defect in the defect model. Specific examples of the defect include a cavity (a first shape), a scratch (a second shape), and a blister (a circular blister, a foreign substance blister, a band-like blister, and the like). Then, each defect type (the cavity, the scratch, and the blister) includes a plurality of defects in different sizes. The luminance distribution is acquired based on an angle (a physical amount) of a preset illumination direction at coordinates of the point cloud of the surface in the predetermined range converted from the defect model, an angle of a preset imaging direction at the coordinates of the point cloud, and an angle of a normal direction to the defect in a plane containing the illumination direction and the imaging direction.

The CPU 7 inspects whether a scratch or a defect is present on the surface of the piston 5 based on a captured image acquired by the camera 2 and the learning result stored in the memory 6 based on a program stored in the memory 6 (an inspection step). The CPU 7 includes a first image generation portion 7*a* and a second image generation portion 7*b*. The first image generation portion 7*a* generates the two-dimensional image of the defect shape based on the defect model. The second image generation portion 7*b* generates the defective product sample image by combining the two-dimensional image with the image of the surface of the piston 5. Further, the CPU 7 conducts the machine learning based on deep learning using a plurality of defective product sample images based on the program stored in the memory 6, and stores the learning result into the memory 6.

Figure 2:
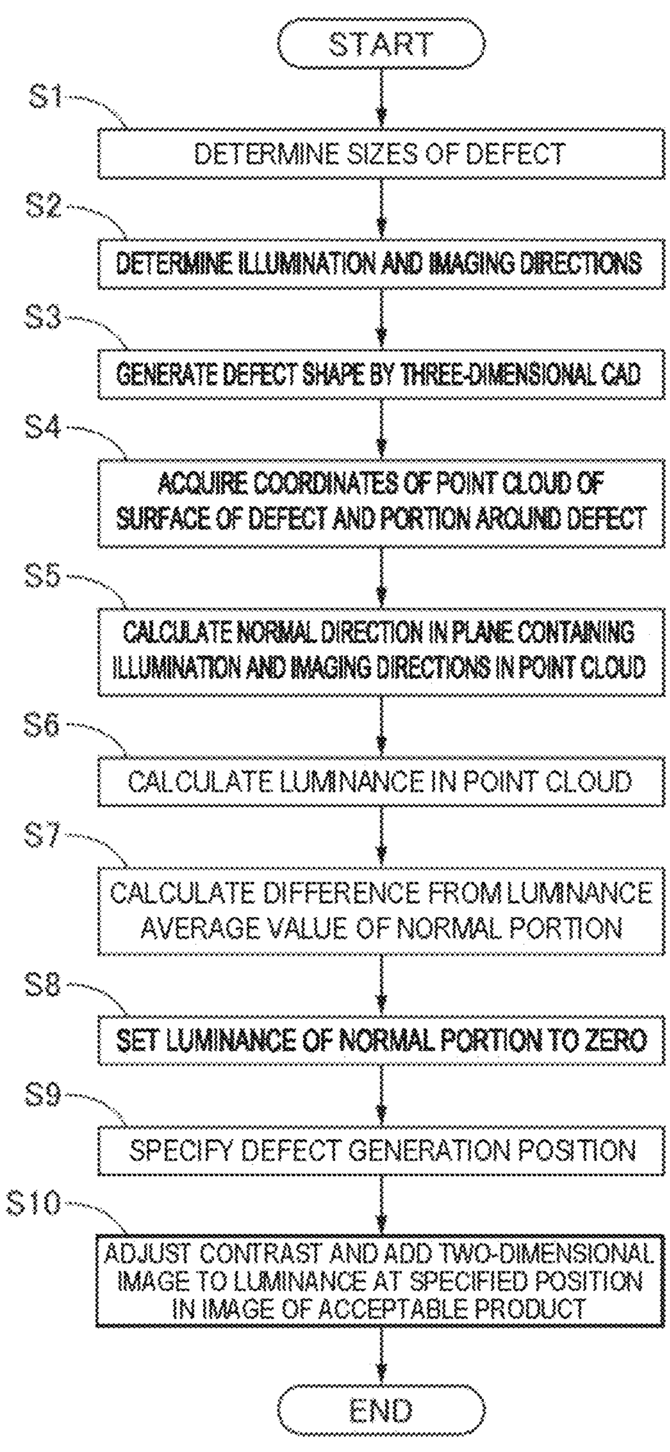
FIG. 2 is a flowchart illustrating a flow of a method for generating a two-dimensional image of a defect shape and a defective product sample image according to the first embodiment.

FIG. 2 is a flowchart illustrating a flow of a method for generating the two-dimensional image of the defect shape and the defective product sample image according to the first embodiment.

In step S1, the first image generation portion 7*a* sets a plurality of sizes according to the type of the defect. The cavity is assumed to be a spherical recess, the scratch is assumed to be a groove having a vertical angle of 60°, the circular blister is assumed to be a circular protrusion having a height of 0.2 mm, the foreign substance blister is assumed to be a protrusion having a vertical angle of 60°, and the band-like blister is assumed to be a band-like protrusion having a height of 0.4 mm. Three sizes are set for each type. For example, diameters 1.0 mm, 2.0 mm, and 4.0 mm are set in the case of the circular blister, and radii 2.0 mm, 4.0 mm, and 6.0 mm are set in the case of the scratch.

In step S2, the first image generation portion 7*a* determines the illumination direction of the illumination device 3 and the imaging direction of the camera 2 based on the illumination direction of the illumination device 3 and the imaging direction of the camera 2 with respect to the actual piston 5.

Figure 3:
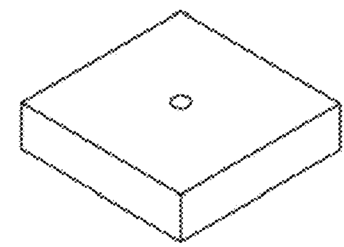
FIG. 3 illustrates a list of defect models.
Figure 3:
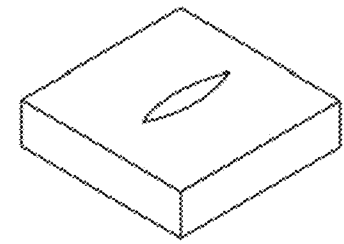
Figure 3:
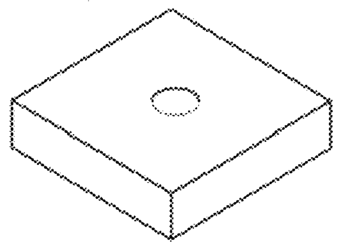
Figure 3:
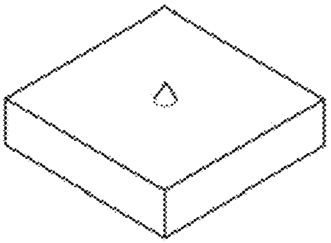
Figure 3:
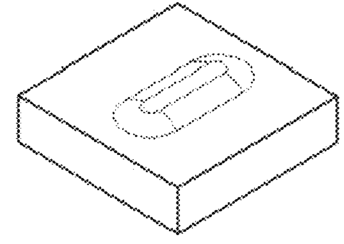

In step S3, the first image generation portion 7*a* generates the three-dimensional model (the defect model) of the defect shape (the defect and the portion around it) using three-dimensional CAD. FIG. 3 illustrates a list of defect models.

Figure 4:
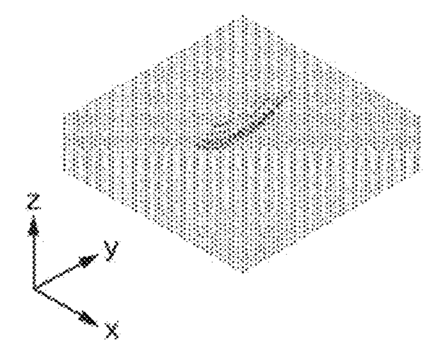
FIG. 4 illustrates how the surface of the defect model is converted into a point cloud.

In step S4, the first image generation portion 7*a* converts the surface of the defect and the portion around it into a point cloud at a pitch of 0.05 mm as illustrated in FIG. 4, and acquires coordinates of the point cloud. The coordinates of the point cloud are expressed in a three-dimensional coordinate system in which a z axis is set to the imaging direction of the camera 2, and an x axis and a y axis perpendicular to each other are set on a plane perpendicular to the z axis.

Figure 5:
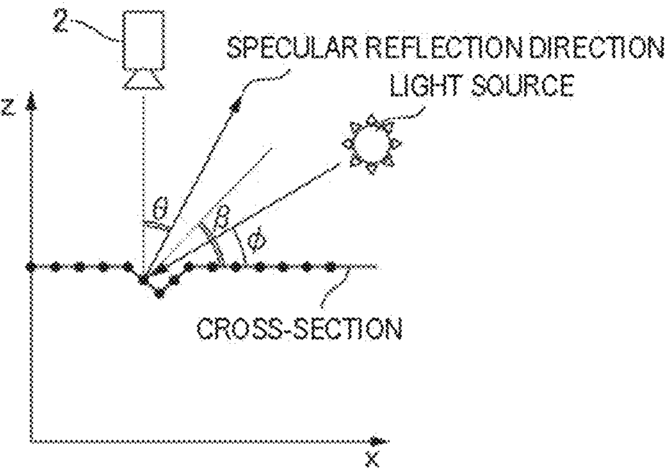
FIG. 5 illustrates a normal angle $\beta$ with respect to a horizontal surface of a scratch and an angle $\theta$ of specularly reflected light with respect to an imaging direction.

In step S5, the first image generation portion 7*a* calculates a normal direction in a plane containing the illumination direction and the imaging direction at each point of the defect. For example, in the case of the scratch, an angle β of the normal direction at each point of the defect with respect to the horizontal plane is calculated from the following equation (1) as illustrated in FIG. 5.

[Equation 1]

$$\beta(x, y) = \tan^{-1}\frac{dz}{dx} \tag{1}$$

In step S6, the first image generation portion 7*a* calculates a luminance at each point in the point cloud. An angle θ of specularly reflected light with respect to the imaging direction is calculated from the following equation (2), assuming that φ represents the illumination direction.

[Equation 2]

$$\theta(x, y) = \frac{\pi}{2} - 2\beta + \phi \tag{2}$$

A luminance L at each point of the defect as viewed from the imaging direction can be calculated using the following equation (3). The equation (3) is an equation expressing a luminance model for calculating the luminance L from an inclination angle (a differential coefficient) of the plane.

[Equation 3]

$$L(x,y(=\rho_s \cos^n \theta(x,y)+\rho_d \tag{3}$$

Figure 6:
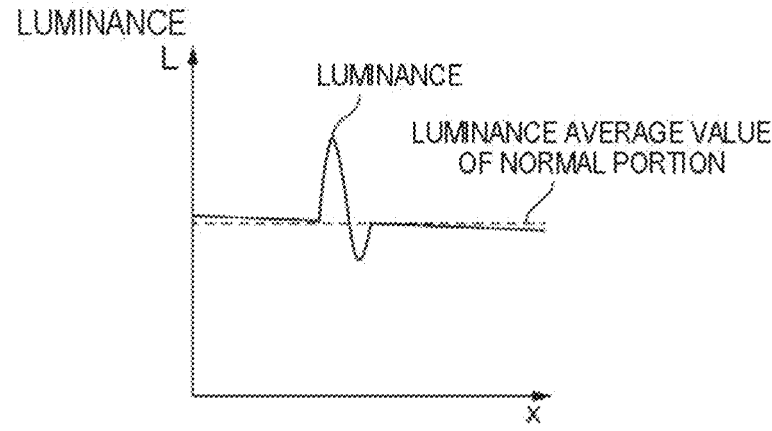
FIG. 6 illustrates a luminance distribution of a scratch in an x-axis direction.

In this equation, $\rho_s$ represents a specular reflection coefficient, $\rho_d$ represents a uniform diffuse reflection coefficient, and n represents a constant, FIG. 6 illustrates a luminance distribution in the x-axis direction in the case of the scratch.

In step S7, the first image generation portion 7*a* calculates a difference between the luminance at each point of the defect and a luminance average value of a normal portion.

In step S8, the first image generation portion 7*a* generates the two-dimensional image of the defect shape to which the luminance distribution is added, with 0 set as the luminance of the normal portion (a first image generation step).

In step S9, the second image generation portion 7*b* determines a defect generation position on the surface of the piston 5.

In step S10, the second image generation portion 7*b* adjusts contrast of the two-dimensional image and adds the two-dimensional image to the luminance at the specified position in an image of an acceptable product, thereby generating the defective product sample image (a second image generation step). FIG. 7 illustrates a list of defective product sample images.

Next, advantageous effects of the first embodiment will be described.

The conventional visual inspection method generates a defect image to be combined with a texture image based on an image indicating a representative two-dimensional shape of a defect (a cavity, a blister, a scratch, or the like), thereby raising a possibility of invoking a sense of strangeness toward an actual defect to result in a failure to accurately inspect a scratch or a defect on the surface of a piston set as an inspection target.

On the other hand, the visual inspection method according to the first embodiment generates the defective product sample image using the two-dimensional image generated from the stereoscopically (three-dimensionally) designed defect model. As a result, the first embodiment can generate the defective product sample image that matches the actual defect (a captured image thereof) without invoking a sense of strangeness, thereby improving the accuracy of inspecting the surface of the piston 5.

Further, the conventional visual inspection method causes a neural network to learn defect images from collected defective product sample images and determines whether a defect is present in the image of the inspection target, thereby involving the following problems.

(1) It takes man-hours and time to collect defective product samples sufficient for the learning in a manufacturing line working at a low defect rate.

(2) Defective product samples should be collected to construct a learning model for a different kind of product.

(3) Changing the imaging device necessitates collection of defective product samples, imaging, and construction of a learning model with respect to all kinds of products.

The visual inspection method according to the first embodiment uses a simulated defective product sample image, thereby eliminating the necessity of collecting and storing defective product samples. The time required to generate defective product sample images is shorter than the time required to collect defective product samples, and therefore actual working time can be shortened. Further, re-learning is not necessary even when the product model is changed, the imaging device is replaced, and the equipment is augmented. Therefore, the inspection efficiency (the inspection accuracy) can be significantly improved. This effect is remarkable in manufacturing lines expected to take time to collect the number of defect samples, such as a manufacturing line working at an especially low defect rate and a manufacturing line designed to manufacture multiple kinds of products.

In the first embodiment, the two-dimensional image is generated while the luminance with respect to the defect model is added thereto. A luminance difference according to the illumination device 3 emerges in the captured image captured by the camera 2, and therefore a defective product sample image that further matches the captured image of the camera 2 can be generated by adding a shade due to the influence of the camera 2 to the two-dimensional image. As a result, the accuracy of inspecting the surface of the piston 5 can be improved.

At this time, the luminance distribution of the two-dimensional image is a luminance distribution in the predetermined range containing the defect and the predetermined portion around it in the defect model. In other words, the calculation load on the CPU 7 can be reduced and the time taken to generate the defective product samples can be shortened by shading only required minimal region required for the inspection of the defect.

In the first embodiment, the two-dimensional image is acquired after the conversion from the defect model into the point cloud. Converting the defect model that is a three-dimensional image into the point cloud facilitates the two-dimension conversion of the defect model.

Further, the luminance distribution is acquired based on the angle $\theta$ of the specularly reflected light with respect to the imaging direction, the illumination direction $\varphi$, and the angle $\beta$ of the normal direction with respect to the horizontal surface at the coordinates of the point cloud of the surface in the predetermined range. As a result, the luminance distribution of the defect can be acquired using the above-described simple equations (1) to (3).

The defect model includes the defect and the predetermined portion around it, and examples of the defect include a cavity, a scratch, and a blister (a circular blister, a foreign substance blister, a band-like blister, and the like). As a result, a defect model supporting a plurality of expected types of defects can be generated.

Further, three types of sizes are set for each of the cavity, the scratch, and the blister. As a result, a defect model supporting defects in different sizes can be generated.

The defect model includes the defect and the predetermined portion around it, and the defect is generated as a geometric envelope. In other words, a defect model supporting a plurality of types of defects can be easily generated by expressing the defect using an envelope formed by translating and rotating a ball, a cone, an elongated hole, or a triangle.

The machine learning in the first embodiment is learning using the neural network. Using the neutral network eliminates the necessity of designing a feature amount, thereby improving the determination accuracy of the visual inspection. Further, the learning is conducted based on deep learning having an intermediate layer as the machine learning, and therefore the determination accuracy of the visual inspection can be improved in comparison with learning using a neural network having only one intermediate layer.

As described above, using the neural network necessitates sufficient defective product samples, but the first embodiment uses simulated defective product samples, and therefore can improve the determination accuracy of the visual inspection without collecting actually existing defective product samples.

Other Embodiments

Having described the embodiment for implementing the present invention, the specific configuration of the present invention is not limited to the configuration of the embodiment, and the present invention also includes a design modification and the like thereof made within a range that does not depart from the spirit of the present invention.

The inspection target (an object to be inspected) is not limited to the piston.

The learning result is not limited to the neural network and the deep learning, and may be any machine learning.

The defect is not limited to the examples cited in the embodiment, and may be any geometric envelope.

In the following description, technical ideas recognizable from the above-described embodiment will be described.

A visual inspection apparatus, according to one configuration thereof, is configured to inspect a surface of an inspection target. The visual inspection apparatus includes an imaging portion configured to image the surface of the inspection target, a storage portion configured to store a learning result acquired by conducting machine learning using a plurality of defective product sample images, which is each generated by combining a two-dimensional image of a defect shape that is generated based on a three-dimensionally pre-generated defect model with an image of the surface of the inspection target, and an inspection portion configured to inspect the surface of the inspection target based on a captured image acquired by the imaging portion and the learning result.

Preferably, in the above-described configuration, the two-dimensional image is generated in consideration of a luminance with respect to the defect model.

According to a further preferable configuration, in any of the above-described configurations, the luminance with respect to the defect model is a luminance distribution in a predetermined range containing a defect and a predetermined portion around the defect in the defect model.

According to further another preferable configuration, in any of the above-described configurations, the luminance distribution is acquired based on a physical amount regarding a preset illumination direction at coordinates of a point cloud of a surface in the predetermined range that is converted from the defect model, a physical amount regarding a preset imaging direction at the coordinates of the point cloud, and a physical amount regarding a normal direction to the defect in a plane containing the illumination direction and the imaging direction.

According to further another preferable configuration, in any of the above-described configurations, the two-dimensional image is acquired based on a point cloud converted from the detect model.

According to further another preferable configuration, in any of the above-described configurations, the defect model includes a defect and a predetermined portion around the defect. The defect includes a first shape and a second shape different from the first shape.

According to further another preferable configuration, in any of the above-described configurations, the defect includes a plurality of the first shapes in different sizes, and a plurality of the second shapes in different sizes.

According to further another preferable configuration, in any of the above-described configurations, the defect model includes a defect and a predetermined portion around the defect. The defect is generated as a geometric envelope.

According to further another preferable configuration, in any of the above-described configurations, the machine learning is learning using a neural network.

According to further another preferable configuration, in any of the above-described configurations, the machine learning is learning based on deep learning.

Further, another aspect is a visual inspection method for inspecting a surface of an inspection target by a computer. The visual inspection method includes an imaging step of imaging the surface of the inspection target, and an inspection step of inspecting the surface of the inspection target based on a captured image acquired by the imaging step and a learning result acquired by conducting machine learning using a plurality of defective product sample images, which is each generated by combining a two-dimensional image of a defect shape that is generated based on a three-dimensionally pre-generated defect model with an image of the surface of the inspection target.

Further, from another aspect, an image generation apparatus is configured to generate a defective product sample image used to inspect a surface of an inspection target. The image generation apparatus includes a first image generation portion configured to generate a two-dimensional image of a defect shape based on a three-dimensionally pre-generated defect model, and a second image generation portion configured to generate the defective product sample image by combining the two-dimensional image with an image of the surface of the inspection target.

Further, another aspect is an image generation method for generating a defective product sample image used to inspect a surface of an inspection target by a computer. The image generation method includes a first image generation step of generating a two-dimensional image of a defect shape based on a three-dimensionally pre-generated defect model, and a second image generation step of generating the defective product sample image by combining the two-dimensional image with an image of the surface of the inspection target.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

REFERENCE SIGNS LIST

1 visual inspection apparatus
2 camera (imaging portion)
3 illumination device
4 computer
5 piston
6 memory (storage portion)
7 CPU (inspection portion)
**7*a*** first image generation portion
**7*b*** second image generation portion

The invention claimed is:

1. A visual inspection apparatus configured to inspect a surface of an inspection target, the visual inspection apparatus comprising:
- an imaging portion configured to image the surface of the inspection target;
- a storage portion configured to store a learning result acquired by conducting machine learning using a plurality of defective product sample images, each of the plurality of defective product sample images being generated by combining a two-dimensional image of a defect shape that is generated based on a three-dimensionally pre-generated defect model with an image of the surface of the inspection target; and
- an inspection portion configured to inspect the surface of the inspection target based on a captured image acquired by the imaging portion and the learning result, wherein:
- the two-dimensional image is generated in consideration of a luminance with respect to the three-dimensionally pre-generated defect model;
- the luminance with respect to the three-dimensionally pre-generated defect model is a luminance distribution in a predetermined range containing a defect and a predetermined portion around the defect in the three-dimensionally pre-generated defect model; and
- the luminance distribution is acquired based on:
  - a physical amount regarding a preset illumination direction at coordinates of a point cloud of a surface in the predetermined range that is converted from the three-dimensionally pre-generated defect model,
  - a physical amount regarding a preset imaging direction at the coordinates of the point cloud; and
  - a physical amount regarding a normal direction to the defect in a plane containing the preset illumination direction and the preset imaging direction.

2. The visual inspection apparatus according to claim 1, wherein
- the defect includes a first shape and a second shape different from the first shape.

3. The visual inspection apparatus according to claim 2, wherein the defect includes a plurality of the first shapes in different sizes, and a plurality of the second shapes in different sizes.

4. The visual inspection apparatus according to claim 1, wherein
- the defect is generated as a geometric envelope.

5. The visual inspection apparatus according to claim 1, wherein the machine learning uses a neural network.

6. The visual inspection apparatus according to claim 1, wherein the machine learning is based on deep learning.

7. A visual inspection method for inspecting a surface of an inspection target by a computer, the visual inspection method comprising:

imaging the surface of the inspection target; and inspecting the surface of the inspection target based on a captured image acquired in the imaging and a learning result acquired by conducting machine learning using a plurality of defective product sample images, each of the plurality of defective product sample images being generated by combining a two-dimensional image of a defect shape that is generated based on a three-dimensionally pre-generated defect model with an image of the surface of the inspection target, wherein:

the two-dimensional image is generated in consideration of a luminance with respect to the three-dimensionally pre-generated defect model;

the luminance with respect to the three-dimensionally pre-generated defect model is a luminance distribution in a predetermined range containing a defect and a predetermined portion around the defect in the three-dimensionally pre-generated defect model; and the luminance distribution is acquired based on:

a physical amount regarding a preset illumination direction at coordinates of a point cloud of a surface in the predetermined range that is converted from the three-dimensionally pre-generated defect model, a physical amount regarding a preset imaging direction at the coordinates of the point cloud; and a physical amount regarding a normal direction to the defect in a plane containing the preset illumination direction and the preset imaging direction.

* * * * *